United States Patent [19]

Cole

[11] 4,298,477
[45] Nov. 3, 1981

[54] REGENERATION OF CATION ION-EXCHANGE POLISHERS

[75] Inventor: Jack L. Cole, Naperville, Ill.

[73] Assignee: Nalco Chemical Company, Oak Brook, Ill.

[21] Appl. No.: 204,596

[22] Filed: Nov. 6, 1980

Related U.S. Application Data

[63] Continuation of Ser. No. 144,266, Apr. 28, 1980, abandoned.

[51] Int. Cl.³ .......................... B01J 49/00; C02F 1/42
[52] U.S. Cl. .................................... 210/674; 210/687
[58] Field of Search ............... 210/670, 674, 681, 687, 210/688; 521/26

[56] References Cited

U.S. PATENT DOCUMENTS

| | | | |
|---|---|---|---|
| 3,392,111 | 7/1968 | Naprice | 210/674 |
| 3,414,507 | 12/1968 | Calmon | 210/674 |
| 3,454,503 | 7/1969 | Blankenhorn | 521/26 |
| 3,755,393 | 8/1973 | Kniese | 521/26 |
| 3,887,498 | 6/1975 | Kuhajek | 521/26 |
| 3,939,071 | 2/1976 | Katzakian | 210/674 |

FOREIGN PATENT DOCUMENTS

| | | | |
|---|---|---|---|
| 4632641 | 7/1969 | Japan | 210/674 |
| 51-12033 | 4/1976 | Japan | 210/674 |
| 52-30261 | 3/1977 | Japan | 210/674 |

Primary Examiner—Ernest G. Therkorn
Attorney, Agent, or Firm—Trexler, Bushnell & Wolters, Ltd.

[57] ABSTRACT

High-pressure boiler feedwater is polished and softened with a cation ion-exchange resin, and the resin is regenerated with a readily ionizable salt of an amine-type corrosion inhibitor.

4 Claims, No Drawings

REGENERATION OF CATION ION-EXCHANGE POLISHERS

This application is a continuation, of application Ser. No. 144,266, filed Apr. 28, 1980, now abandoned.

FIELD OF THE INVENTION

This invention relates generally to water-conditioning systems and more particularly to the regeneration of ion-exchange resins. In one specific aspect, the present invention relates to the regeneration of cation ion-exchange polishers used in high-pressure boiler systems.

BACKGROUND OF THE INVENTION

In the operation of industrial boiler systems, the common practice for many years has been to use a cation resin ion-exchanger, regenerated with sodium chloride, as a condensate filter or polisher. The purpose of such a filter or polisher has been twofold, namely to capture the particulate iron and copper ordinarily present in industrial plant systems and to remove any trace of calcium or magnesium hardness. In low-pressure boiler systems, the amounts of sodium ion released by the ion-exchange resin are generally of no consequence. However, in high-pressure boiler systems, i.e., those operating at about 1500 p.s.i. for example, polished condensate which contains the customary levels of sodium salts cannot be utilized with complete success as boiler feedwater. High-pressure boiler systems are particularly susceptible to internal corrosion, especially hydrate corrosion; and it is the ordinary practice in the operation of these systems both to use a volatile amine for inhibiting corrosion and to regulate the pH of the system with a phosphate, for example. It has been found that sodium ion, even in low concentration, is capable of releasing undesirable hydroxide ion in these systems thereby promoting corrosion. Moreover, when condensate containing a volatile amine corrosion inhibitor is regenerated by means of a sodium-cycle cation resin, cationic amines exchange for sodium ion, with the result that sodium ion is released to the system and the amine corrosion inhibitor is extracted.

SUMMARY OF THE INVENTION

The present invention solves the prior art problems of sodium ion release and corrosion inhibitor reduction by regenerating a cation exchange resin with a readily ionizable salt of the particular amine that is used in the system for corrosion inhibition. In systems inhibited with morpholine, the sulfate and acetate salts of morpholine have proved eminently useful. In such an arrangement, the resin bed continues to serve as a particulate filter and any trace hardness which may be present is removed with the release of morpholine cation. There is no concomitant reduction in the amount of the corrosion inhibitor and no undesirable discharge of sodium ion into the feedwater.

It follows that a general object of the present invention is to provide a new and improved method of regenerating a cation ion-exchange resin.

Another object of the invention is to provide a method of treating boiler feedwater which precludes sodium leakage and also preserves or even enhances the desired level of corrosion inhibitor.

These and other objects and features of the invention will become more apparent from a consideration of the following descriptions.

DETAILED DESCRIPTION OF THE INVENTION

In order that the principles of the invention may be readily understood, embodiments thereof, applied to a zeolite resin system but to which the application is not to be restricted, are described hereinbelow. It will be appreciated that the invention is applicable to any strong acid, cation ion-exchange resin including zeolites and both natural and synthetic organic sulfonates.

As is well known, the term zeolite is used to describe a class of hydrated alumino-silicates that contain easily exchangeable cations such as sodium or potassium. The zeolites are either natural or synthetic products, usually the latter, and may be expressed by the generalized formula:

$$Na_2O \cdot R_2O_3 \cdot nSiO_2 \cdot xH_2O$$

wherein $R_2O_3$ is either $Al_2O_3$ or $Fe_2O_3$, wherein n is the number 5 or greater, and wherein x represents varying amounts of water of hydration. When hard water to be softened is caused to flow through the ordinary bed of zeolite resin, calcium and magnesium ions are removed by the zeolite and replaced by sodium ions; and the zeolite, when almost completely converted to calcium and magnesium compounds, is thereupon regenerated by treatment with an excess of brine. The present invention contemplates the alteration of this conventional process in order to adapt it to the needs of high-pressure boiler feedwater treatment systems.

The regenerant compound of the invention is an organic salt, the corresponding organic compound of which is useful in a boiler condensate system as a corrosion inhibitor; and salts of such organic compounds as morpholine, cyclohexamine and triethanolamine are useful in the practice of the invention. The anion of the regenerant compound is selected to be readily ionizable in solution; and sulfates, acetates and chlorides satisfy the requirement.

Broadly, the present method treats a water supply to remove undesirable cations by providing a bed of cation-exchange resin, passing the water which is to be treated through the resin bed, and regenerating the resin with an aqueous solution of a regenerate amine salt.

In order to describe the invention more fully, the following specific examples are given without, however, limiting the invention to the precise details and conditions described except as is set forth in the appended claims.

EXAMPLES 1 THROUGH 4

Description of Test Equipment

A suitable number of identical pilot columns were constructed to simulate conditions in an actual boiler condensate polisher. Each column was fabricated to be four feet long with a diameter of two inches. The columns were filled to a bed depth of about thirty inches with Dowex HGR-W2 zeolite ion-exchange resin in the sodium form. Each column was charged with 0.055 cu.ft. of the resin and was operated at a flow rate of 0.6 gal./min. This rate equals 26 gpm/sq.ft.

Sodium levels were monitored on the common influent to the columns and on the effluent of each column. A Leeds & Northrup Sodium-Ion Analyzer capable of detecting sodium ion in aqueous samples over a three-decade log scale was employed. The 1.0–1,000 ppb scale was used. The accuracy of the Sodium-Ion Analyzer is stated to be ±3%; and below 50 ppb, on an increasing concentration, response speed is 90% in thirty seconds. On a decreasing concentration, response speed is 90% in approximately two minutes. With this equipment, and an auxiliary shell and tube condenser, the condensate samples were not exposed to extraneous contamination during the analyzing process.

Calcium ion was continuously monitored on the common influent to the columns to pinpoint any hardness excursions during the test period and none were observed. An Orion 1520 calcium monitor was employed to measure calcium ion concentration. This monitor is characterized by both fast response and sensitivity; and the range of measurement is from 0.001 ppm to 10 ppm calcium. Precision of measurement is stated to be within ±10%, and response to a concentration change takes place within one minute. The pH and conductivity were also monitored periodically during the test program.

Operation and Results

The column of Example No. 1 was initially regenerated with six liters of aqueous 10% NaCl. The column was downflow regenerated over a period of twenty-six minutes. This regenerant transfer rate is in excess of the minimum commercial regenerant rate by 30%. The displacement rinse was applied at the same flow rate for sixteen minutes. The column was fast rinsed at 0.6 gpm for forty minutes to an effluent conductivity of 15 umhos.

The column of Example No. 2 was initially regenerated with six liters of aqueous 10% morpholine. The regenerant transfer time was twenty-nine minutes. The regenerant was displaced with rinse water at the same flow rate for sixteen minutes. The column was then rinsed at 0.6 gpm until the effluent conductivity reached 14 umhos.

The column of Example No. 3 was first regenerated with six liters of 1 N morpholine acetate. The regenerant was applied over a period of twenty-eight minutes. The unit was slow rinsed for sixteen minutes and fast rinsed until the effluent conductivity reached 10 umhos.

The column of Example No. 1 was used as a control and to verify that the sodium zeolite pilot column accurately represented an actual sodium zeolite condensate polisher. Collected data established that comparable sodium leakage were obtained from a condensate polisher and the pilot column.

The column of Example No. 2, the morpholine wash column, showed an initial reduction in sodium leakage into the effluent of 23% from 650 ppb to 500 ppb. This reduction was short-lived as the leakage increased to the original level approximately eight hours after the column was placed on line. After twenty-four hours of operation, both the column of Example No. 2 and the control column showed sodium levels of about 750 ppb.

The column of Example No. 3 which was regenerated with morpholine acetate showed an initial, remarkable, reduction in sodium leakage of 75% to 165 ppb; and after a short period of time, less than seventy-two hours of operation, stabilized at a level of about 100 ppb.

The column of Example No. 4 was set up to perform a longer term study using morpholine acetate and was regenerated a second time after one hundred twenty hours of operation. After the second regeneration, the sodium leakage level was well below 50 ppb.

The column of Example No. 5 was preliminarily regenerated with six liters of 1 N morpholine sulfate; and the results obtained were generally similar to those obtained from the morpholine acetate regenerated column.

The specific examples described hereinabove are to be considered as being primarily illustrative. Various changes beyond those described will, no doubt, occur to those skilled in the art; and such changes are to be understood as forming a part of this invention insofar as they fall within the spirit and scope of the appended claims.

The invention is claimed as follows:

1. A method of treating boiler condensate water to remove undesirable cations which comprises the steps of: providing a bed of cation-exchange resin; passing water which is to be treated through said resin bed; and regenerating said resin with an aqueous solution of a morpholine.

2. A method of treating water to remove undesirable cations according to claim 1 wherein said resin is a zeolite.

3. A method of treating water to remove undesirable cations according to claim 1 wherein said morpholine salt is morpholine acetate.

4. A method of treating water to remove undesirable cations according to claim 1 wherein said morpholine salt is morpholine sulfate.

* * * * *

UNITED STATES PATENT AND TRADEMARK OFFICE
CERTIFICATE OF CORRECTION

PATENT NO. : 4,298,477
DATED : November 3, 1981
INVENTOR(S) : JACK L. COLE

It is certified that error appears in the above-identified patent and that said Letters Patent are hereby corrected as shown below:

Column 4, line 1 change "leakage" to --leakages--;

Column 4, line 39 change "morpholine" to --morpholine salt--.

Signed and Sealed this

Sixteenth Day of February 1982

[SEAL]

Attest:

GERALD J. MOSSINGHOFF

*Attesting Officer*  *Commissioner of Patents and Trademarks*